US00RE36506E

United States Patent [19]

Dempsey et al.

[11] E Patent Number: Re. 36,506

[45] Reissued Date of Patent: Jan. 18, 2000

[54] ANTENNA DESIGN USING A HIGH INDEX, LOW LOSS MATERIAL

[75] Inventors: Richard C. Dempsey, Chatsworth, Calif.; Daniel W. Drago, Beaver Creek, Ohio; Carl O. Jelinek, Camarillo, Calif.

[73] Assignee: California Microwave, Woodlane Hills, Calif.

[21] Appl. No.: 09/168,826

[22] Filed: Oct. 8, 1998

Related U.S. Patent Documents

Reissue of:

[64] Patent No.: 5,563,616
Issued: Oct. 8, 1996
Appl. No.: 08/210,829
Filed: Mar. 18, 1994

[51] Int. Cl.[7] ..... H01Q 19/00

[52] U.S. Cl. ..... 343/753; 343/756; 343/909; 343/700 MS

[58] Field of Search ..... 343/753, 756, 343/755, 700 MS, 795, 787, 909, 911 R; H01Q 19/00

[56] References Cited

U.S. PATENT DOCUMENTS 3,754,271 8/1973 Epis ..... 343/756
5,017,939 5/1991 Wu ..... 343/753
5,047,296 9/1991 Miltenberger et al. ..... 428/694
5,260,712 11/1993 Engheta et al. ..... 343/700 MS

*Primary Examiner*—Hoanganh Le
*Attorney, Agent, or Firm*—Burns, Doane, Swecker & Mathis, L.L.P.

[57] ABSTRACT

Antenna elements and systems and other radio and microwave frequency devices are constructed with a high index of refraction medium having high matched values of relative permeability and relative permittivity, and a low loss tangent. By making the permeability of the transmission medium substantially equal to its relative permittivity, the impedance of the material is matched to that of the surrounding free space or air. By immersing a radiating element in such a material, and/or by using such a material between adjacent radiating elements or between a radiating element and a reflective ground plane, the physical size and/or the spacing of the elements may be substantially reduced without appreciable performance loss, thereby resulting in a more compact device that is particularly desirable for mobile applications. At least one exemplary such material is formed in layers and has electrical properties which are anisotropic and homogeneous and which vary as a function of frequency; the layers of such a material are preferably oriented such that the particular frequencies of radiation propagating through each layer are presented with high matched values of relative permittivity and relative permeability, and low values of dielectric and magnetic loss tangents.

13 Claims, 5 Drawing Sheets

ANTENNA DESIGN USING A HIGH INDEX, LOW LOSS MATERIAL

Matter enclosed in heavy brackets [ ] appears in the original patent but forms no part of this reissue specification; matter printed in italics indicates the additions made by reissue.

FIELD OF THE INVENTION

The present invention relates generally to the use of a high-index of refraction, low loss transmission medium in an electromagnetic device, and more particularly to relatively compact antenna elements and systems containing a high index of refraction medium having matched values of relative permittivity and relative permeability and low values of dielectric and magnetic loss tangents.

BACKGROUND ART

Antenna elements and systems, and other radio and microwave devices, are conventionally constructed from conductive radiating elements, transmission lines and ground planes, and non-conductive spacers, mechanical supports, and other components. Their design typically requires the selection of appropriate materials. Size, weight, electrical properties and environmental resistance are primary parameters of interest.

For example, the current trend in mobile antenna designs, such as those required by aircraft, ships and other vehicles, result in a need for low profile, directional antenna configurations which can conveniently be made to conform to the shape of a mobile unit, such as an airplane wing, while providing excellent beam steering and electromagnetic properties. Moreover, safety and fuel economy have become important factors in vehicle mounted antenna design. Projections from mobile antennas mounted on such vehicles are not only hazardous, but also cause drag and instability to the vehicle and vibration while the vehicle is in motion.

However, radiating elements must typically be positioned at least one quarter wavelength away and parallel to a ground plane (such as the metallic skin of an aircraft) to prevent unwanted cancellation between the radiated signal from the radiating elements and the reflected signals from the ground plane. When the plane of the elements are brought closer to the ground plane, the reflected waves from the surface interferes with the directed waves, producing a loss in signal strength and in radiation efficiency. Placing a dielectric substrate having a high dielectric constant between the ground plane and the plane of the elements has been used to minimize such losses. When a high dielectric material is placed between the ground plane and the radiating element, the incident radiation is slowed down by the index of refraction (H) of the material; however, increasing the dielectric constant (relative permittivity—$\epsilon_r$) to 10 or more without a similar increase in relative permeability ($\mu_r$) results in a severe impedance mismatch and thus is not technically desirable for many broadband applications.

To achieve sufficient bandwidth, conventional meander-line polarizers require multiple layers of material spaced at least one quarter wavelength apart, and thus tend to be a wavelength in length or longer. When such devices are applied to apertures which are less than approximately one wavelength in size or when they are forced into the flares of small horns, a serious deterioration in performance results. Conventional radio and microwave frequency polarizers are also subject to losses caused by high loss tangents and severe impedance mismatching at the entrance and exit ports. Prior art radio frequency and microwave lenses and other electromagnetic devices operating in the radio and microwave frequency ranges suffer from similar drawbacks.

It is known to reduce the size of a conventional loop or whip antenna by embedding it in a ferrite loading material. Although it utilizes materials which are quite lossy, such a loaded design more than compensates for the mismatch losses that would otherwise result between the maximum practical antenna size for a portable AM radio (tens of centimeters) or other handheld device designed to receive a signal in the kilohertz range, and the optimal antenna size that would be required as those frequencies (tens of meters) in the absence of any loading material.

It has also been proposed to use a commercially available surface wave absorber material having a relatively high refractive index to microwave radiation as a low propagation velocity material between various planar radiating elements of a broadband antenna and their respective ground planes; however, the heretofore known such materials had a relatively high loss tangent (on the order of 0.3) and the resultant efficiency is an order of magnitude less than acceptable for most commercial applications.

U.S. Pat. No. 3,540,047 (Walser) discloses radiation absorbing layers forming a three dimensional array of thin ferromagnetic elements with all the elements having a common uniaxial anisotropy axis, which is usable at microwave frequencies (200 mHz to 2 gHz). Although the patent hints at the possibility of other uses requiring a "reduced" magnetic loss tangent, the disclosed examples are intended only to absorb incident radiation and do not appear to have either matched values of relative permittivity and relative permeability, or low magnetic loss tangents, at the microwave frequencies of interest. U.S. Pat. No. 5,047,296 (Miltenberger) discloses another anisotropic radiation absorption material formed from layers of individual blocks of amorphous magnetic films, with the different layers having crossed magnetic axes. That material also does not appear to have either matched values of relative permittivity and relative permeability, or low magnetic loss tangents. However, at least from the latter patent, it is apparent that the real and imaginary permeability components of the array are primarily dictated by the corresponding properties of the bulk material from which the individual elements are formed, and thus it should be possible to manufacture similar materials with other electrical properties.

DISCLOSURE OF INVENTION

The preceding and other shortcomings of prior art electromagnetic devices are addressed and overcome by the present invention which, in its broadest aspect provides a radio or microwave frequency device having at least one radiating element and one or more layers of a transmission medium having low loss tangents and high, matched values of relative permittivity and relative permeability, with the radiating element being oriented with respect to the transmission medium that at least some of the radiation associated with the radiating element is propagated through the transmission medium. In connection with the foregoing, it should be noted that as used herein, "radiating element" may refer to either a receiving element which is illuminated by radiation from an external source or to a transmitting element which radiates radiation in the direction of an external receiver, or to a reflector (such as a conductive ground plane) for such radiation, or to a radiation transforming device such as a lens, prisms, or polarizer which is illuminated by radiation from an external source and which transmits that radiation in modified form to an external receiver.

In accordance with a first specific aspect, the invention increases the effective spacing between the antenna element and a reflective ground plane by orienting at least one layer of an anisotropic transmission medium such that a substantial portion of the radiation propagating through the transmission medium in the vicinity of the ground plane has its electrical and magnetic components aligned with an axis of the transmission medium having high relative permittivity and with an axis having high relative permeability, respectively.

In accordance with a second specific aspect, the present invention increases the effective size of the radiating element by orienting at least one layer of an anisotropic transmission medium such that a substantial portion of the radiation propagating through the transmission medium in the vicinity of the radiating element has its electrical and magnetic components aligned with an axis of the transmission medium having high relative permittivity and with an axis having high relative permeability, respectively (i.e., the ratio is essentially equal to one).

In accordance with a third specific aspect, the present invention provides an improved impedance match between the transmission medium and the surrounding free space by ensuring that a substantial portion of the radiation at an interface between the transmission medium and the surrounding air or free space has its electrical and magnetic components aligned with respective axes of the transmission medium having substantially equal respective values of relative permittivity and relative permeability.

BRIEF DESCRIPTION OF THE DRAWINGS

The foregoing and additional features and advantages of this invention will become further apparent from the detailed description and accompanying drawing figures, in which numerals indicate the various structural elements of the invention, like numerals referring to like elements.

In the drawings.

DETAILED DESCRIPTION OF PREFERRED EMBODIMENT(S)

In its broadest aspect, the present invention matches a high index of refraction, low loss transmission medium to electromagnetic radiation propagating from, to, or within a radio or microwave frequency device, to thereby decrease the effective size of and/or distance between one or more conductive elements within the device, and is adaptable to various antenna systems, as well as to other radio and microwave frequency devices, such as waveguides, polarizers, diffraction gratings, prisms and lenses.

Figure 1:
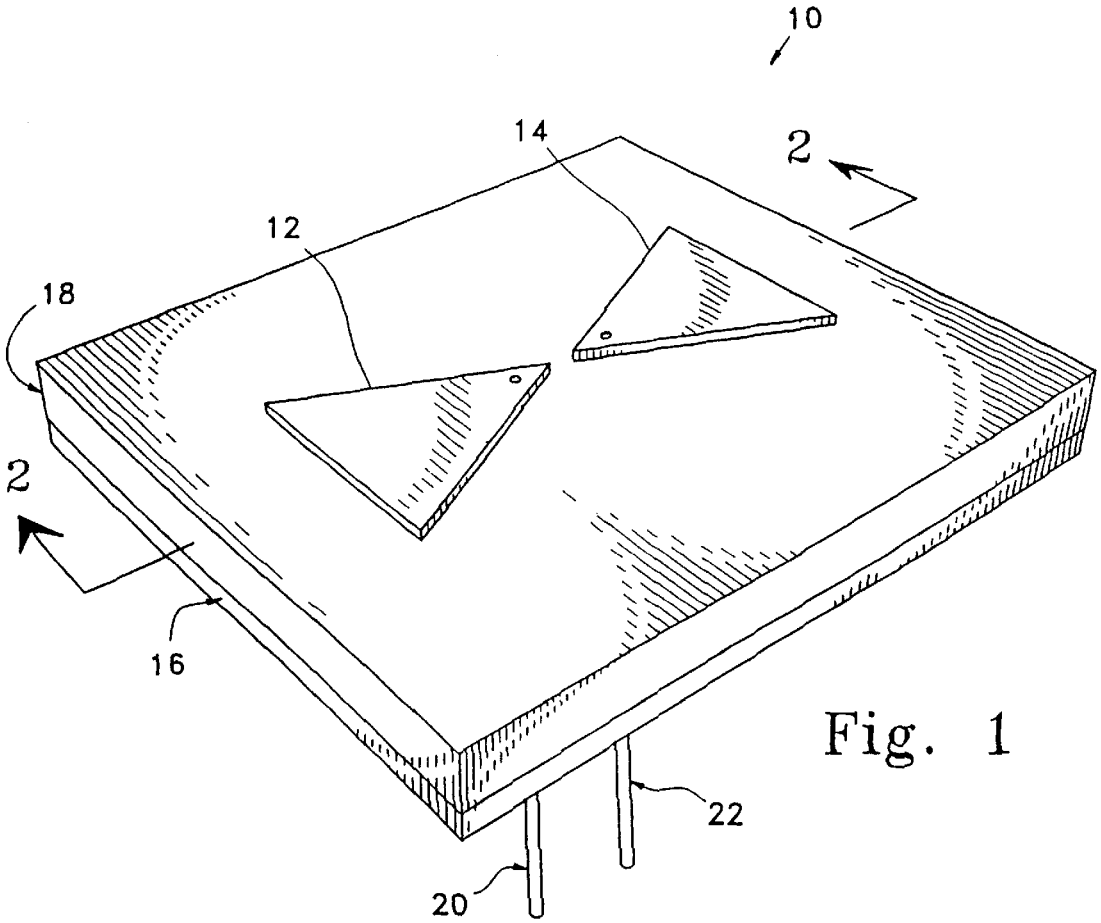
FIG. 1 is a view of a dipole antenna element over a ground plane with a high index of refraction medium between the plane of the element and the ground plane, in accordance with one aspect of the present invention.

Referring now to FIG. 1, dipole element 10 includes two bow-tie shaped arms 12 and 14 positioned on high index of refraction substrate 18, the opposite surface of which is covered by ground plane 16. Signal power is applied to (or received from) arms 12 and 14 by balanced feed lines 20 and 22, respectively. The construction of dipole element 10 is similar to that of a conventional dipole element in that it is formed by depositing, plating or etching the metal arms 12 and 14 on the substrate 18. The surface of dipole element 10 may be covered by the same high index of refraction transmission material as used for substrate 18, by a conventional radio frequency transparent material (not shown) or the exposed surface of dipole element 10 may be positioned above the surface of a vehicle skin so that it radiates outward directly into the surrounding air or free space.

In accordance with one important aspect of the present invention, the high index of refraction transmission medium forming substrate 18 has matched values of relative permittivity and relative permeability at the frequency of interest, so that there is a good impedance match between the transmission medium and the surrounding air or free space.

The characteristic impedance Z of a medium is given by the equation:

$$Z = \frac{Z_0}{\sqrt{\frac{\mu_r}{\epsilon_r}}} \tag{1}$$

where $Z_1$=impedance of free space or dry air=377 ohms;

$\mu_r$=relative permeability; and $\epsilon_r$=relative permittivity.

From equation (1) it will be seen that, when the relative permittivity is equal to the relative permeability, the characteristic impedance of the medium will be the same as that of free space or air, and the losses due to impedance mismatch will be negligible.

Figure 2:
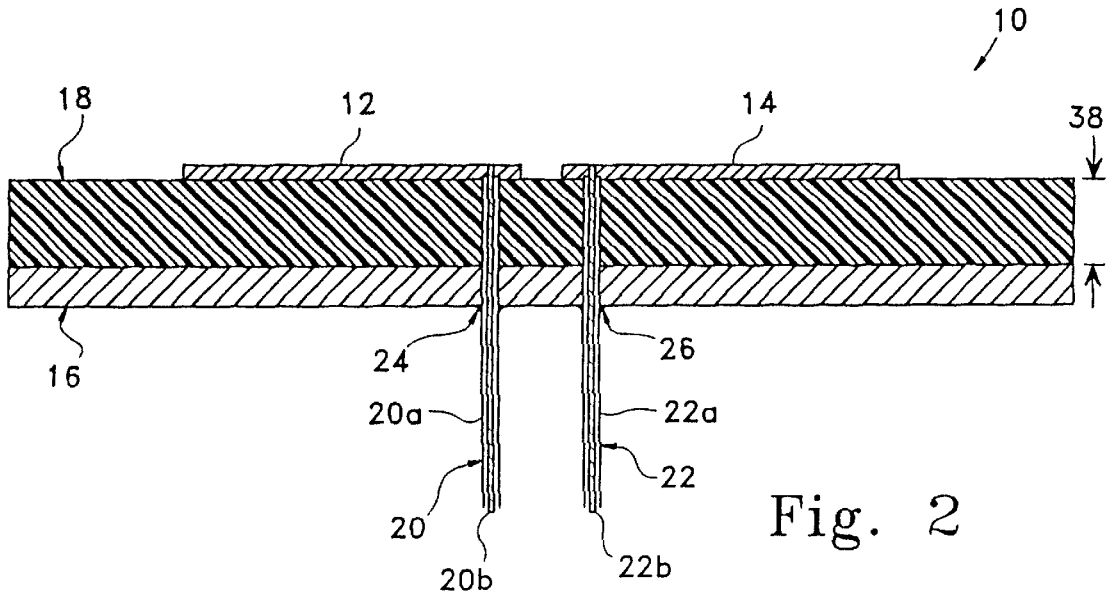
FIG. 2 is a side view of the dipole antenna element shown in FIG. 1.

FIG. 2 is a side view of dipole element 10 shown in FIG. 1 over ground plane 16 with high index transmission medium substrate 18 filling the entire space between the plane of dipole element 10 and ground plane 16. The outer ground conductors 20a, 22a of coaxial feed lines 20 and 22 are electrically connected to ground plane 16, while the inner signal conductors 20b, 22b of feed lines 20 and 22 pass through respective holes 24 and 26 in the high index transmission medium substrate 18 and are electrically connected to the respective inner ends of arms 12 and 14 of dipole element 10. In a conventional dipole antenna over a ground plane, optimum performance is obtained when the distance 38 between ground plane 16 and the plane of dipole element 10, is equal to one quarter wavelength and the back radiation from dipole element 10 reflecting off of (and thereby subjected to a phase delay of 180°) the ground plane 16 is in phase with, and thus reinforces, the forward radiation from dipole element 10.

The index of refraction is given by the equation:

$$n=c/v \tag{2}$$

where v=velocity of electromagnetic waves in the medium; and c=speed of light in free space.

The velocity of propagation in a nonconductive material is given by the equation:

$$v = \frac{c}{\sqrt{\epsilon \cdot \mu}} \tag{3}$$

where $\epsilon$=permittivity; and $\mu$=permeability.

Thus, the index of refraction n is equal to:

$$n = \sqrt{\epsilon \cdot \mu}$$

In the exemplary embodiment of FIG. 1, $\epsilon_r$ and $\mu_r$ are both greater than 10, and preferably are substantially greater than 10. Accordingly, the transmission medium forming substrate 18 will have an index of refraction substantially higher than 10 and radiation will propagate through the substrate 18 at a reduced velocity relative to its velocity in air or free space, substantially less by a factor equal to its index of refraction. Moreover, the physical distance through the substrate 18 corresponding to a quarter wavelength will also be substantially less than a quarter wavelength of the same frequency in free space, by the same factor.

Figure 3:
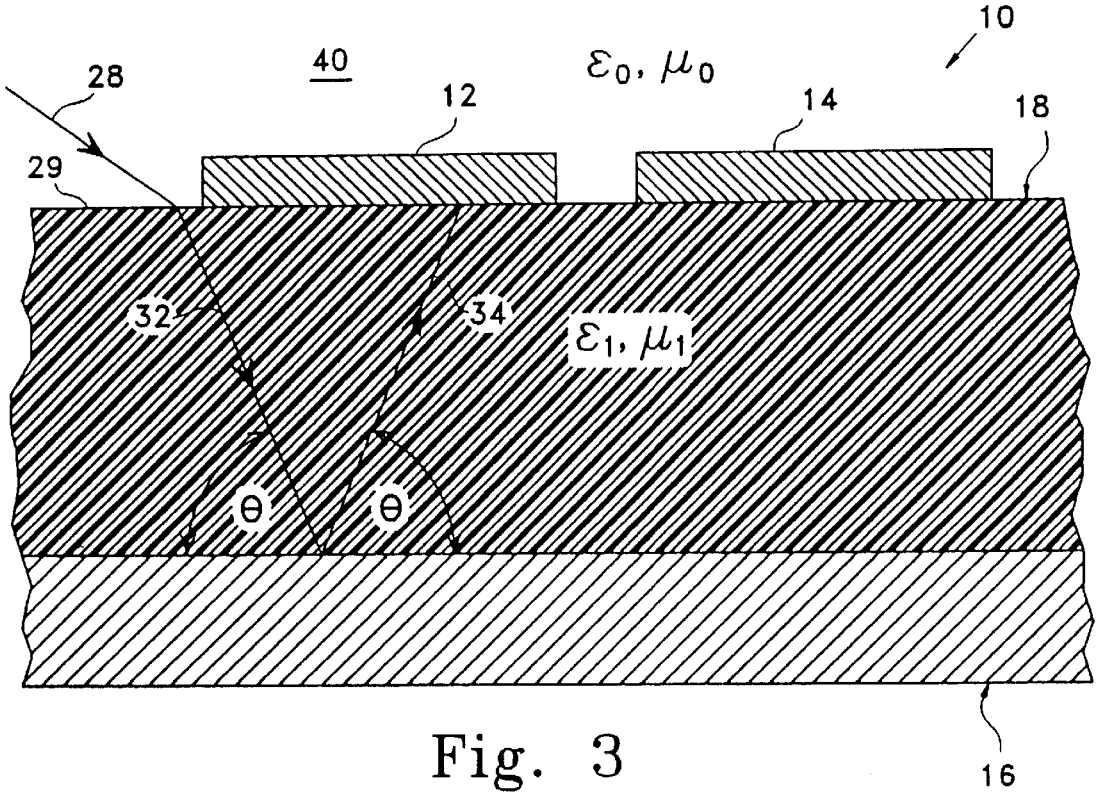
FIG. 3 is another side view of the dipole antenna element shown in FIG. 1, showing the relationship between the incident radiation and refracted radiation.

FIG. 3 generally corresponds to FIG. 2, but is a ray diagram showing incident radiation 28 propagating through free space 40, and impinging upon the surface of high index of refraction substrate 18. As in the example of FIGS. 1 and 2, incident radiation 28 typically is an electromagnetic wave propagating through free space at velocity c, with a frequency within the radio to microwave frequency range.

Substrate 18 permits incident radiation 28 to penetrate into, and interact with, the substrate 18. As noted previously, substrate 18 preferably has the properties of low loss tangent and high matched values of relative permittivity and relative permeability. Accordingly, it provides a lower velocity of propagation to electromagnetic waves, such as incident radiation 28, and a matched impedance to free space or air. Incident radiation 28 propagates through free space 40 at velocity c. At the boundary 29 between free space 40 and high index transmission medium substrate 18, incident radiation 28 refracts due to the discontinuity between the velocity of propagation through free space and the velocity of propagation through substrate 18, with the refracted radiation 32 propagating at a velocity v inversely proportional to the refractive index n of the medium.

Still referring to FIG. 3, at the boundary 36 between high index transmission medium substrate 18 and ground plane 16, refracted radiation 32 is reflected off of ground plane 16 at an angle θ; the reflected radiation 34 intercepts arm 12 of dipole element 10. Thus refracted radiation 32 in substrate 18 recombines with the radiation induced in the antenna elements at a shorter position due to the change in the index of refraction n between free space 40 and substrate 18, resulting in a longer effective element length for a given distance between the arms 12,14 and the ground plane 16.

The above discussion assumes an homogeneous transmission medium 18. Although the known high index, low loss transmission mediums at the wavelengths of interest (radio frequency to microwave) are fabricated in layers and have anisotropic electromagnetic properties, in principal it should be possible to fabricate a transmission medium from variously oriented smaller units of an anisotropic material, such that at larger scales the material would appear isotropic. In any event, the loss tangent, an additional loss term due to the complex quantities of the physical constants, should preferably be made significantly lower than found in conventional radiation absorption materials. The loss tangent is determined by the ratio of the imaginary component of the permeability (or permittivity) to the real component of the permeability (or permittivity), and can be adjusted by selecting the mixture of materials used and by appropriate binding and curing of the materials and designed for specific frequency bands.

Figure 4:
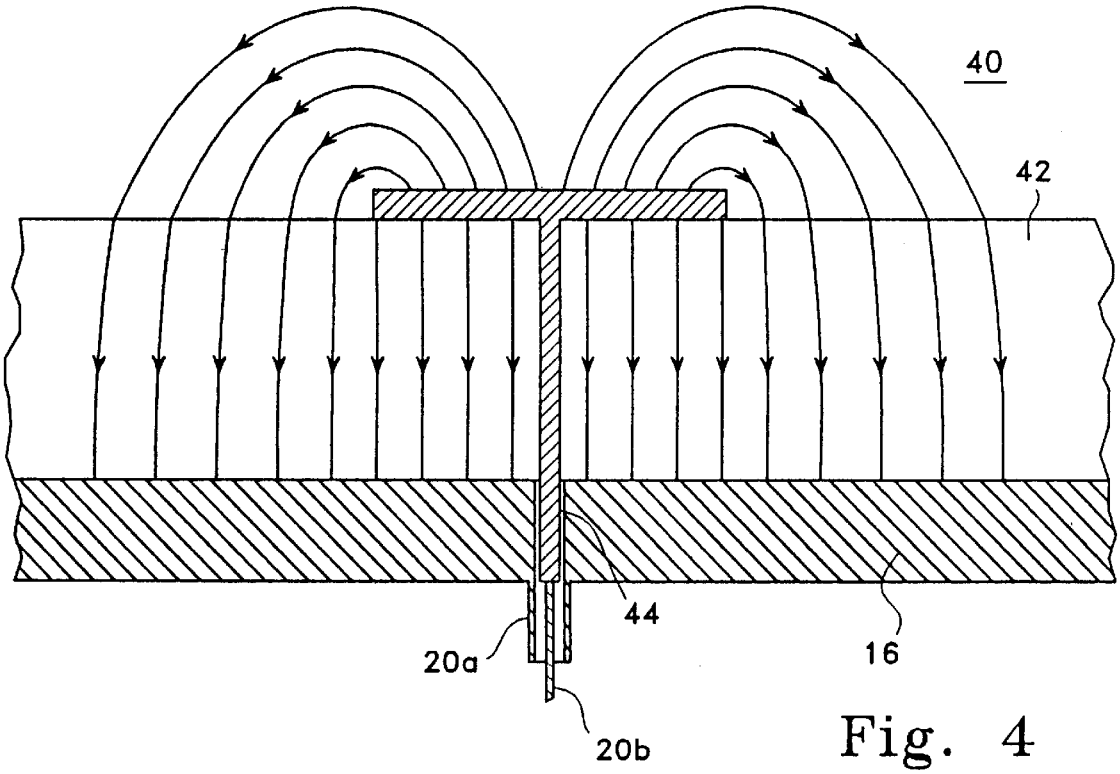
FIG. 4 is a side view of a capacitively loaded monopole antenna element over a ground plane modified in accordance with another aspect of the present invention, showing the orientation of the magnetic and electrical components of the radiation.
Figure 4A:
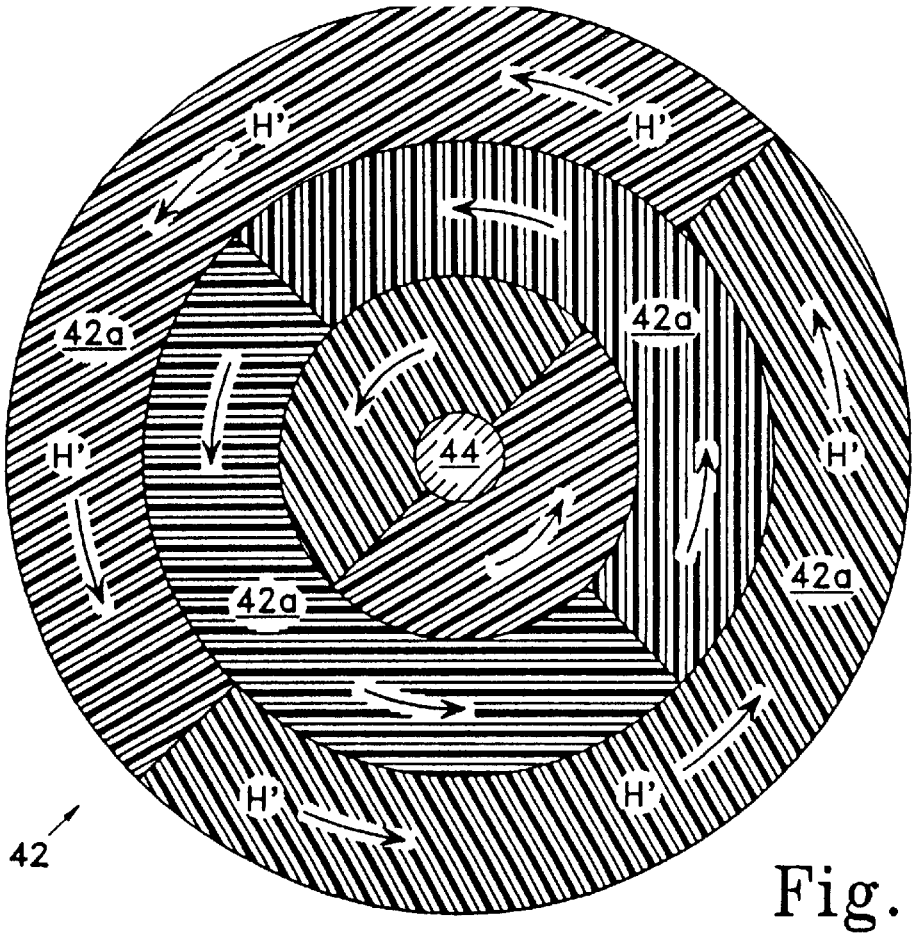
FIGS. 4A and 4B are respective plan views of the antenna of FIG. 4, showing two possible orientations of a layered anisotropic transmission medium relative to the radiating element.
Figure 4B:
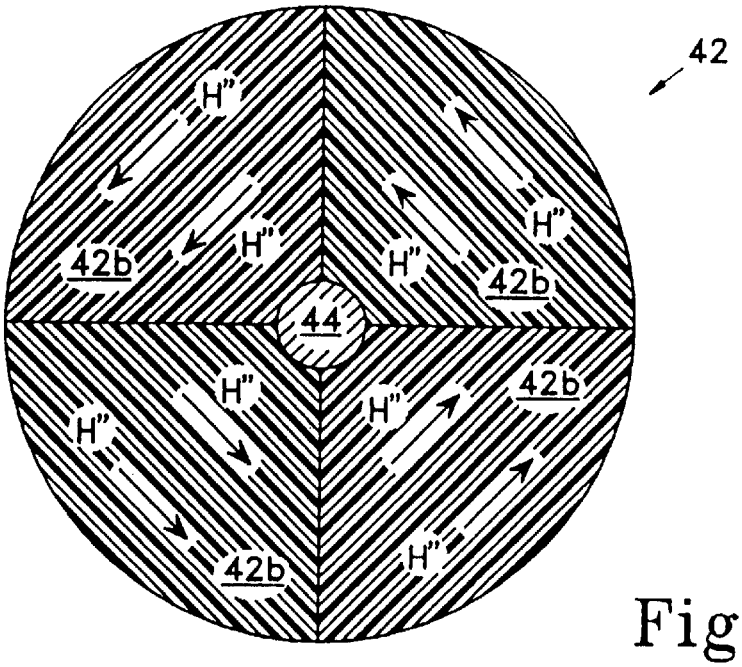

In accordance with yet another aspect of the present invention, as shown in FIG. 4, rather than using an isotropic material as the high index transmission medium 18, the transmission medium 42 may be oriented with respect to the E and H vectors associated with the radiation propagating through the material such that the desired high matched values of the relative permittivity and relative permeability (which will in general be different for different axes of the material) are associated with axes aligned with the E and H vectors, thus providing the desired lower velocity of propagation to electromagnetic waves and a matched impedance to free space or air. In particular, FIG. 4 shows a capacitor loaded monopole antenna including a vertical radiating element 44 extending through a hole 24 in the ground plane 16 and connected to the inner conductor 20b of a single coaxial conductor 20 whose grounded outer conductor 20a is connected to ground plane 16. The other end of the vertical radiating element 44 is terminated by a circular cap 46, which capacitively loads the element 44. In accordance with the present invention, it is desirable to immerse vertical element 44 in one or more layers of high index transmission medium 42 with an axis of the material 42 having a high relative permittivity aligned the E vectors (which as shown by the solid arrows, are vertical in the vicinity of the vertical conductor 44 and in the vicinity of the ground plane, and have a vertical component throughout the transmission medium 42) and having a high value of relative permeability aligned with the H vectors (which form concentric circles about vertical radiating element 44 perpendicular to the E vectors, and which in the cross section shown in the figure, are also perpendicular to the plane of the figure). Assuming that the anisotropic transmission medium 42 is formed in layers with the desired high value of permeability being associated with only one axis H and that axis is the plane of each layer and that the desired high value of permittivity is associated with at least one other axis E also in the plane of each layer and perpendicular to the axis of high relative permeability, then (as illustrated in the top view of FIG. 4A) the required orientation can be accomplished by orienting each of the layers forming the anisotropic transmission medium 42 as one or more separate concentric cylindrical segments 42a about the vertical radiating element 44, with the high relative permeability axis H' perpendicular to the E vectors and generally parallel to the ground plane. On the other hand, if the desired high value of permittivity is associated with an axis perpendicular to the individual layers, and the desired high permeability is associated with at least one axis H in the plane of each layer, then (as illustrated in FIG. 4B) the layers can arranged as stacked layers 42 parallel to ground plane 16, each layer 42 comprising a plurality of circular segments 42b surrounding vertical element 44 with its high permeability axis H" perpendicular to the radius. In a similar manner, any high index of refraction transmission medium having at least two perpendicular axes associated respectively with a desired high permeability and a desired high permittivity can be decomposed into layers of individual cylindrical segments 42a, circular segments 42b, or other similar layer-like geometrical elements such that the mutually perpendicular E and H vectors in the transmission medium 42 may be substantially aligned with mutually perpendicular axes of the transmission medium having the desired high permittivity and permeability values.

As a practical matter, because the electrical and magnetic fields in the near field of a radiating element depend on the charge distribution and current density at different portions of the radiating element and are therefore difficult to calculate a priori, it is preferable to measure the relevant electric and magnetic field intensity vectors E and H experimentally for a particular configuration of antenna elements at the frequencies of interest. Once the near field electric and magnetic vectors have thus been determined experimentally, the individual layers forming the high index of refraction substrate can each be oriented with the relevant axes aligned with those vectors.

The present invention is not limited to the application of high index of refraction transmission medium to the antenna configurations described above. Using the same concepts and principles described above, high index transmission medium may be used in the construction of radio and microwave frequency devices which are smaller and lower loss. For example, such a high index of refraction, low loss transmission medium can be used in polarizers, radio frequency lenses, prisms, diffraction gratings, loaded wave guides, and other radio and microwave devices which are smaller and lower loss.

Figure 5:
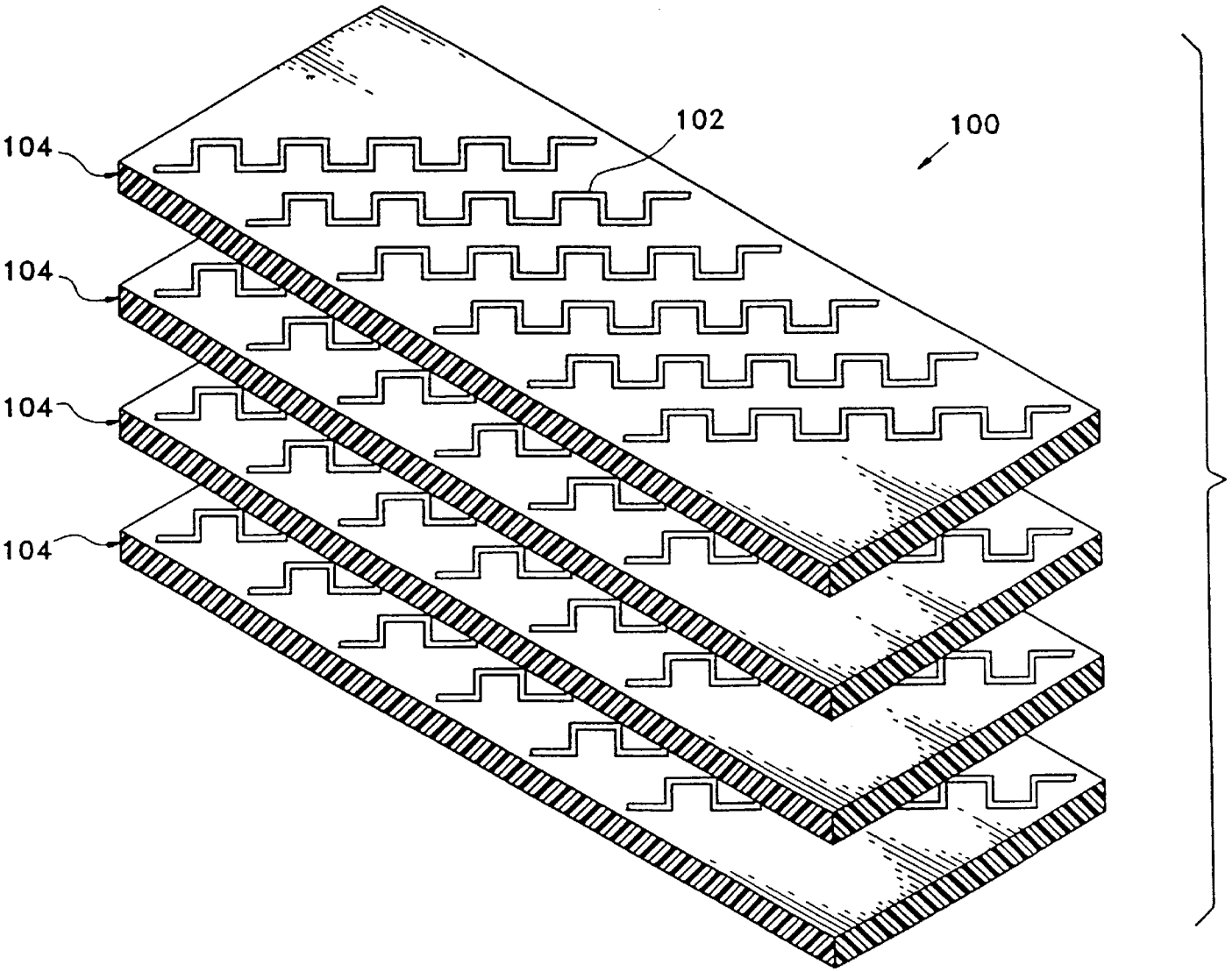
FIG. 5 is a view of a multi-layer meander-line polarizer modified in accordance with the present invention.

In particular, the present invention can be used to design smaller and lower loss polarizers. Referring to FIG. 5, multi-layer meander-line polarizer plate 100 includes meander-lines 102 etched on a conductive upper surface 103 of high index of refraction transmission medium layer 104. The physical configuration of polarizer plate 100 is similar to that of conventional multi-layer meander-line structures, and may be formed as a bonded sandwich of a plurality of such etched sheets of high index of refraction transmission media 104. In general, a greater number of such layers yields greater bandwidth.

It will be appreciated that, in accordance with the present invention, polarizer plate 100, fabricated from a high index of refraction, low loss transmission medium, is substantially smaller than conventional multi-layer meander-line structures. In particular, polarizer plate 100 can be made electrically shorter by an amount equal to the index of refraction n of the transmission medium 104.

Figure 6A:
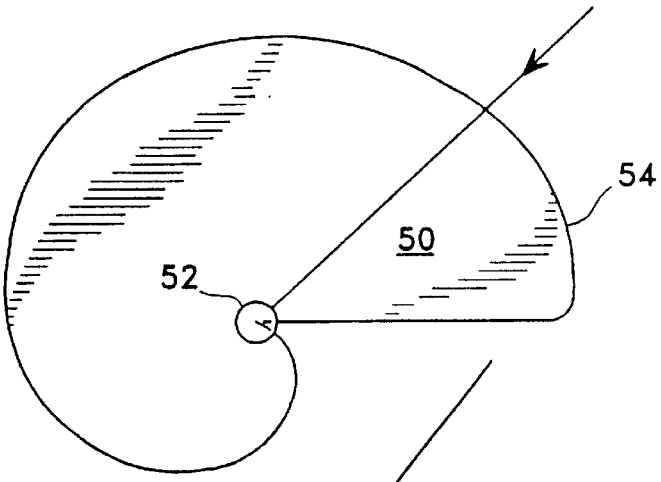
FIG. 6 comprising FIG. 6A
FIG. 6B shows a direction finder including a spiral of a high index of refraction transmission medium in the transmission paths to one of its two receiving elements employing phase difference to measure angle of arrival.
Figure 6B:
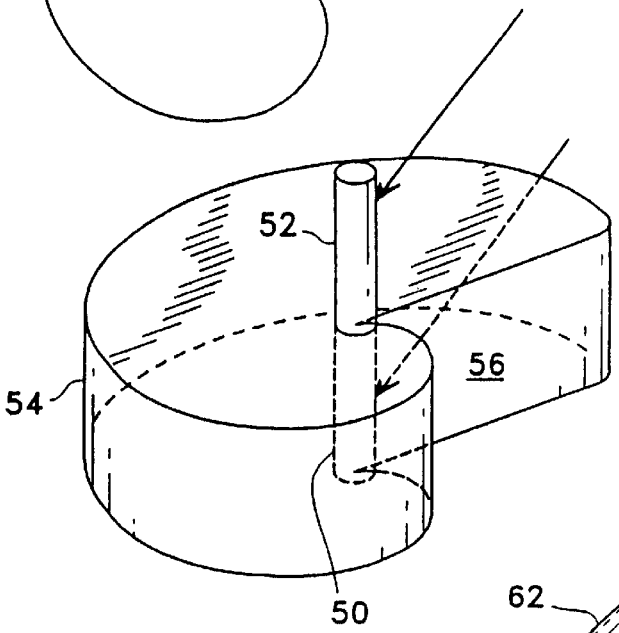
Figure 7:
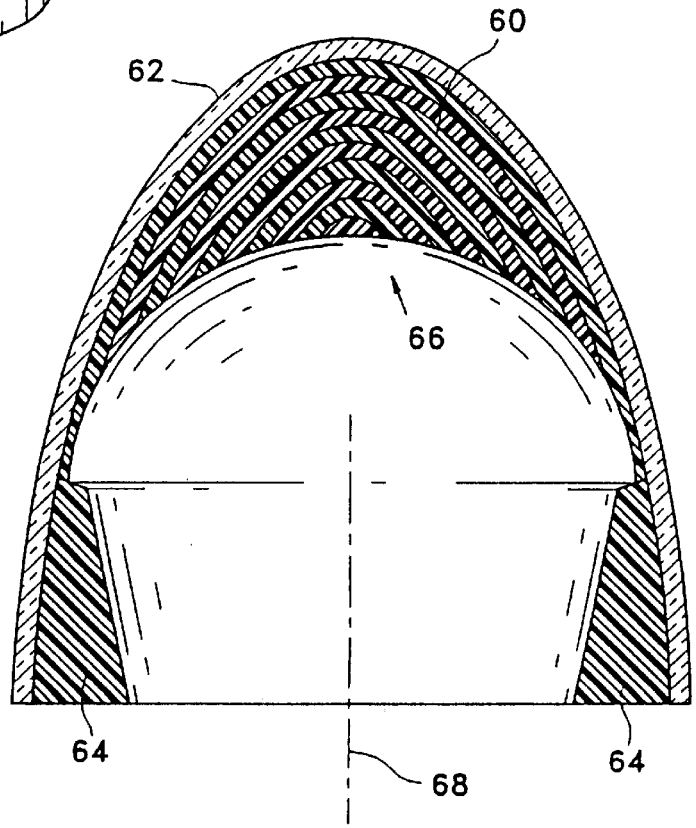
FIG. 7 shows a lens of a high index of refraction transmission medium inside a radome above an antenna aperture.

FIG. 6A is an isometric view of a prior art direction finder modified in accordance with the present invention. In particular, it includes a stacked pair of vertical receiving elements 50, 52, with the lower element 50 immersed in a spiral 54 of transmission medium 56 having an index of refraction greater than that of the surrounding free space. Accordingly, as shown in the plan view of FIG. 6B, radiation from a remote source will have to travel through a thickness of the transmission medium 56 which is a linear function of the angle of arrival ↓, and therefore will be delayed in time or phase by a linear function of theta, relative to the time or phase the same signal is received by upper element 52. Therefore, by measuring the phase or time difference of arrival between the loaded and unloaded antenna elements, the angle of arrival may be calculated. However, unlike the known direction finder, the transmission medium has loss tangents substantially less than 0.3 and matched values of relative permittivity and relative permeability substantially greater than (and preferably an order of magnitude greater than) 10 for a predetermined frequency of interest. Since the delay is a function of the index of refraction times the distance, the present invention permits a more compact and efficient unit than would otherwise be possible. FIG. 7 shows yet another application of some of the principles underlying the present invention, this time to a lens 60 inside a radome 62. Sidelobe absorbers 64 of a convention high loss material are provided at either side of an antenna aperture 66. The lens 60 is circularly symmetric about the antenna boresight 68 and may be formed from a stack of paraboloid-shaped layers 60a of a low loss, high index of refraction transmission medium having equal high values of permittivity and permeability in the plane of the material and low dielectric and magnetic loss tangents.

Persons skilled in the art should realize that the scope of the present invention is not limited to what has been shown and described hereinabove, but only by the claims which follow.

What is claimed is:

1. A device for use with radio or microwave frequency radiation including a predetermined frequency of interest, said device comprising:

at least one radiating element operatively coupled to radiation at said predetermined frequency of interest and one or more layers of a transmission medium having dielectric and magnetic loss tangents each [substantially] less than 0.3 and matched values of relative permittivity and relative permeability [substantially] greater than 10 for said predetermined frequency of interest, wherein the radiating element is oriented with respect to the transmission medium such that at least some of the radiation coupled to the radiating element is propagated through the transmission medium at a velocity less [that] *than* the velocity of said radiation in free space by a factor substantially equal to said relative permittivity.

2. The device of claim 1 wherein said loss tangents are an order of magnitude less than 0.3.

3. The device of claim 1 wherein said relative permittivity and relative permeability are an order of magnitude greater than 10.

4. The device of claim 1 wherein said radiating element comprises two arms of a dipole antenna element, said device further comprises a reflective ground plane, and said transmission medium is disposed between said arms and said ground plane.

5. The device of claim 1, further comprising a reflective ground plane, wherein:

said transmission medium is an anisotropic transmission medium; and a substantial portion of the radiation propagating through the transmission medium in the vicinity of the ground plane has its electrical and magnetic components aligned with an axis of the transmission medium having said high relative permittivity and with an axis having said high relative permeability, respectively.

6. The device of claim 5 wherein said radiating element is a capacitively loaded monopole antenna.

7. The device of claim 1, wherein:

said transmission medium is an anisotropic transmission medium; and a substantial portion of the radiation propagating through the transmission medium in the vicinity of the radiating element has its electrical and magnetic components aligned with an axis of the transmission medium having said high relative permittivity and with an axis having said high relative permeability, respectively.

8. The device of claim 7 wherein said radiating element is a capacitively loaded monopole antenna.

9. The device of claim 1, wherein a substantial portion of the radiation at an interface between the transmission medium and the surrounding air or free space has associated electrical and magnetic fields aligned with respective axes of the transmission medium having said substantially equal respective values of relative permittivity and relative permeability.

10. The device of claim 9 wherein said radiating element is a capacitively loaded monopole antenna.

11. A direction finder device for use with radio or microwave frequency radiation including a predetermined frequency of interest, said device comprising:

first and second receiving elements each operatively coupled to radiation at said predetermined frequency of interest; and one or more layers of a transmission medium having dielectric and magnetic loss tangents each substantially less than 0.3 and matched values of relative permittivity and relative permeability substantially greater than 10 for said predetermined frequency of interest, said transmission medium surrounding said first receiving element and oriented with respect to the first receiving element such that substantially all of the radiation coupled to the receiving element from a remote source is propagated through the transmission medium in a propagation direction which is perpendicular to an interface surface between the transmission medium and the surrounding air or free space, said interface surface being separated from said first receiving element along said propagation direction by a propagation distance which is a function of the angular orientation of said source relative to said first receiving element.

12. A device for use with radio or microwave frequency radiation including a predetermined frequency of interest, said device comprising:

an antenna aperture; and a paraboloid lens formed from one or more layers of a transmission medium having loss tangents dielectric and magnetic loss tangents each [substantially] less than 0.3 and matched values of relative permittivity and permeability [substantially] greater than 10 for said predetermined frequency of interest, wherein the aperture is coupled to the lens such that substantially all of the radiation passing through the aperture is propagated through the transmission medium at a velocity less [that] *than* the velocity of said radiation in free space by a factor substantially equal to said relative permittivity.

13. A polarizer usable at a predetermined frequency of interest, said polarizer comprising a stacked array of multilayer meander-line polarizer plates, each plate consisting of a conductive surface defining a plurality of meander-lines and a layer of a transmission medium, wherein said transmission medium has dielectric and magnetic loss tangents each [substantially] less than 0.3 and matched values of relative permittivity and permeability [substantially] greater than 10 for said predetermined frequency of interest.

* * * * *